Nov. 24, 1953  E. S. MacPHERSON  2,660,449
WHEEL SUSPENSION FOR MOTOR VEHICLES
Filed Jan. 27, 1949  3 Sheets-Sheet 2
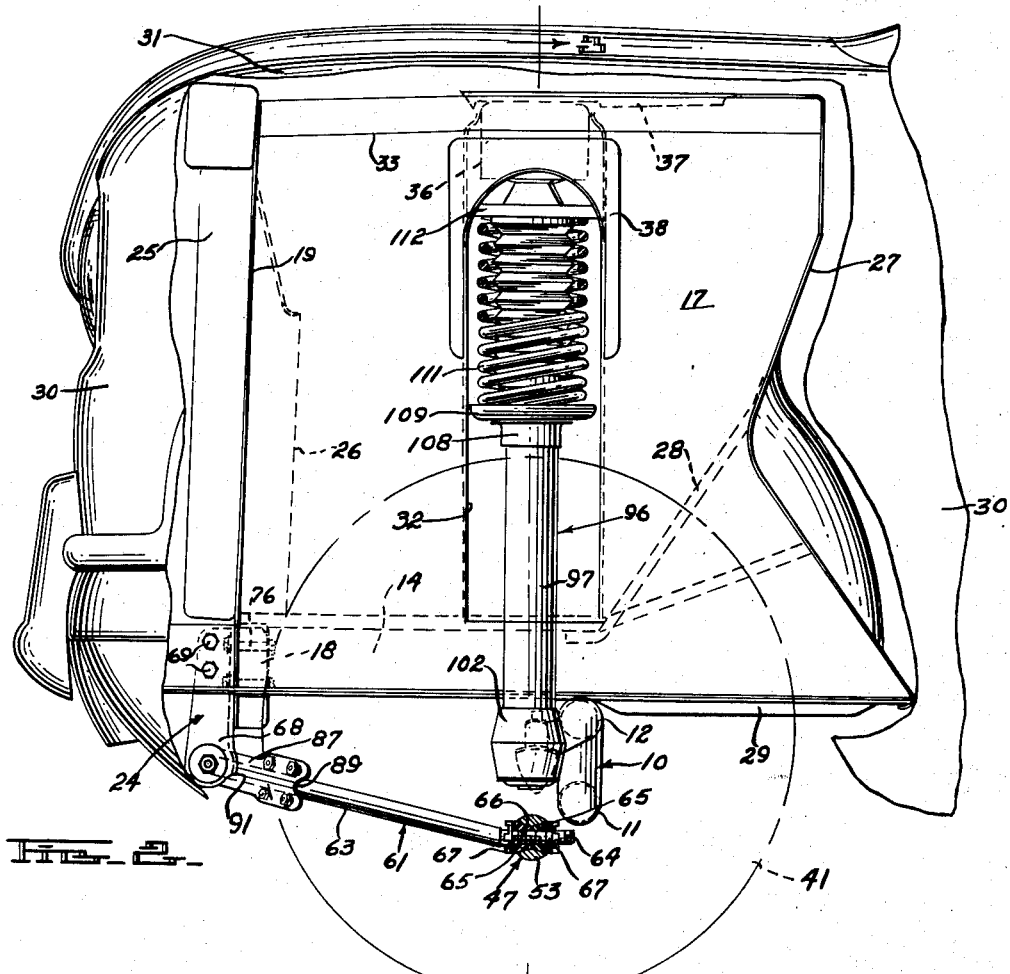
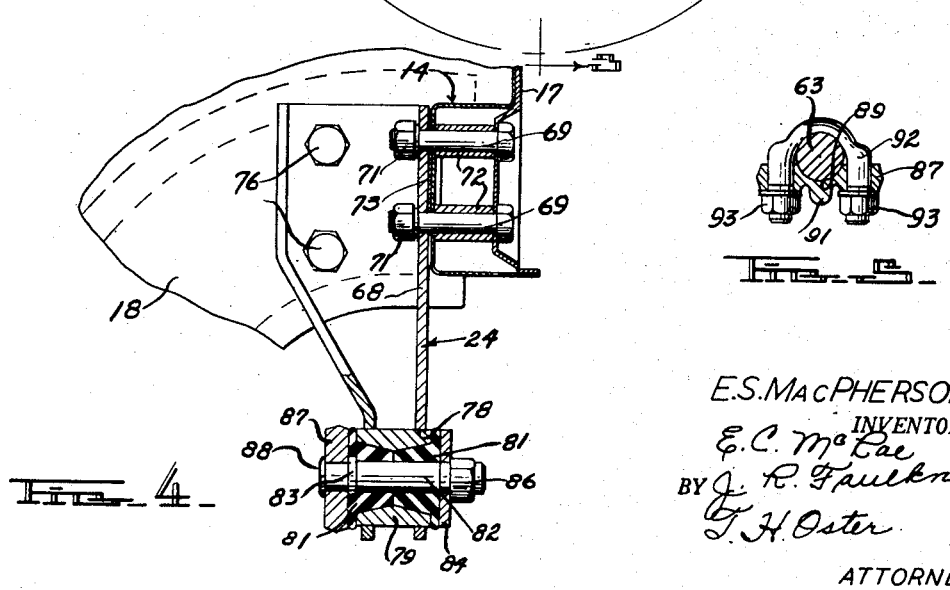
E.S. MacPHERSON
INVENTOR.
BY E. C. McRae
J. R. Faulkner
T. H. Oster
ATTORNEYS Nov. 24, 1953　　　E. S. MacPHERSON　　　2,660,449
WHEEL SUSPENSION FOR MOTOR VEHICLES
Filed Jan. 27, 1949　　　　　　　　　　　3 Sheets-Sheet 3
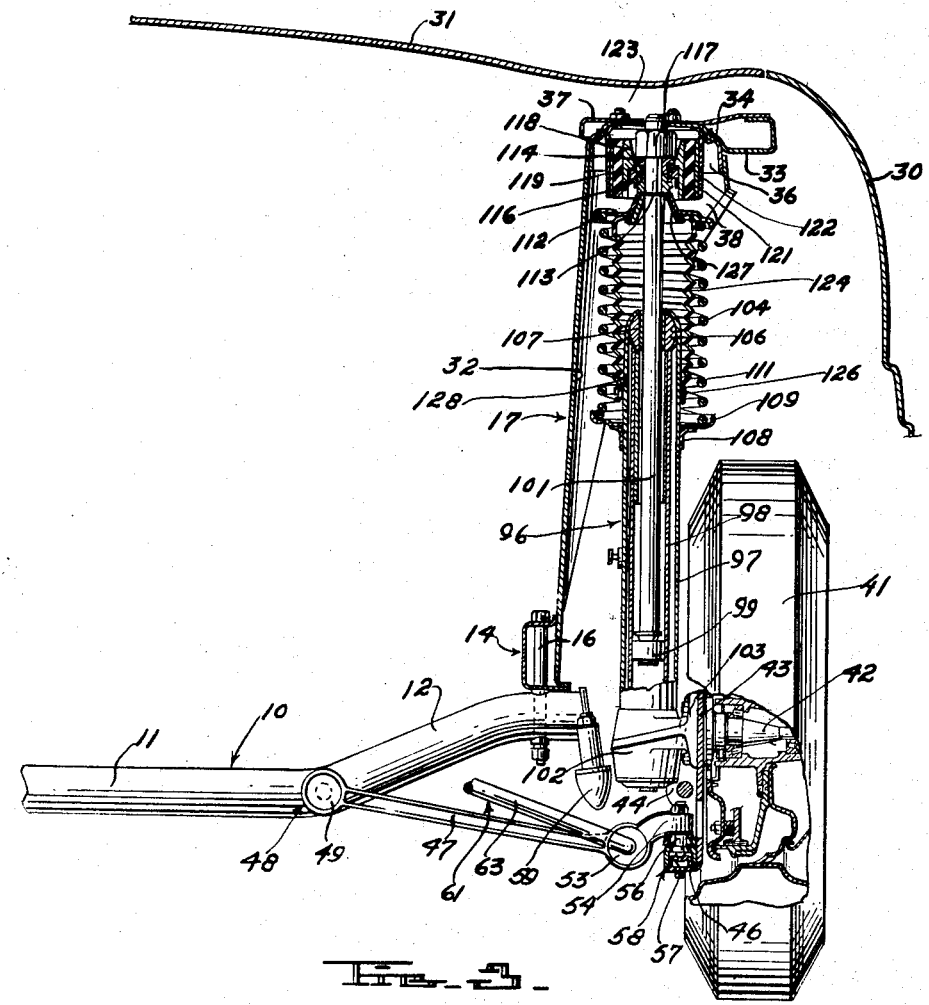
E. S. MacPHERSON
INVENTOR.
BY E. C. McRae
　 E. L. Faulkner
　 T. H. Oster
ATTORNEYS Patented Nov. 24, 1953

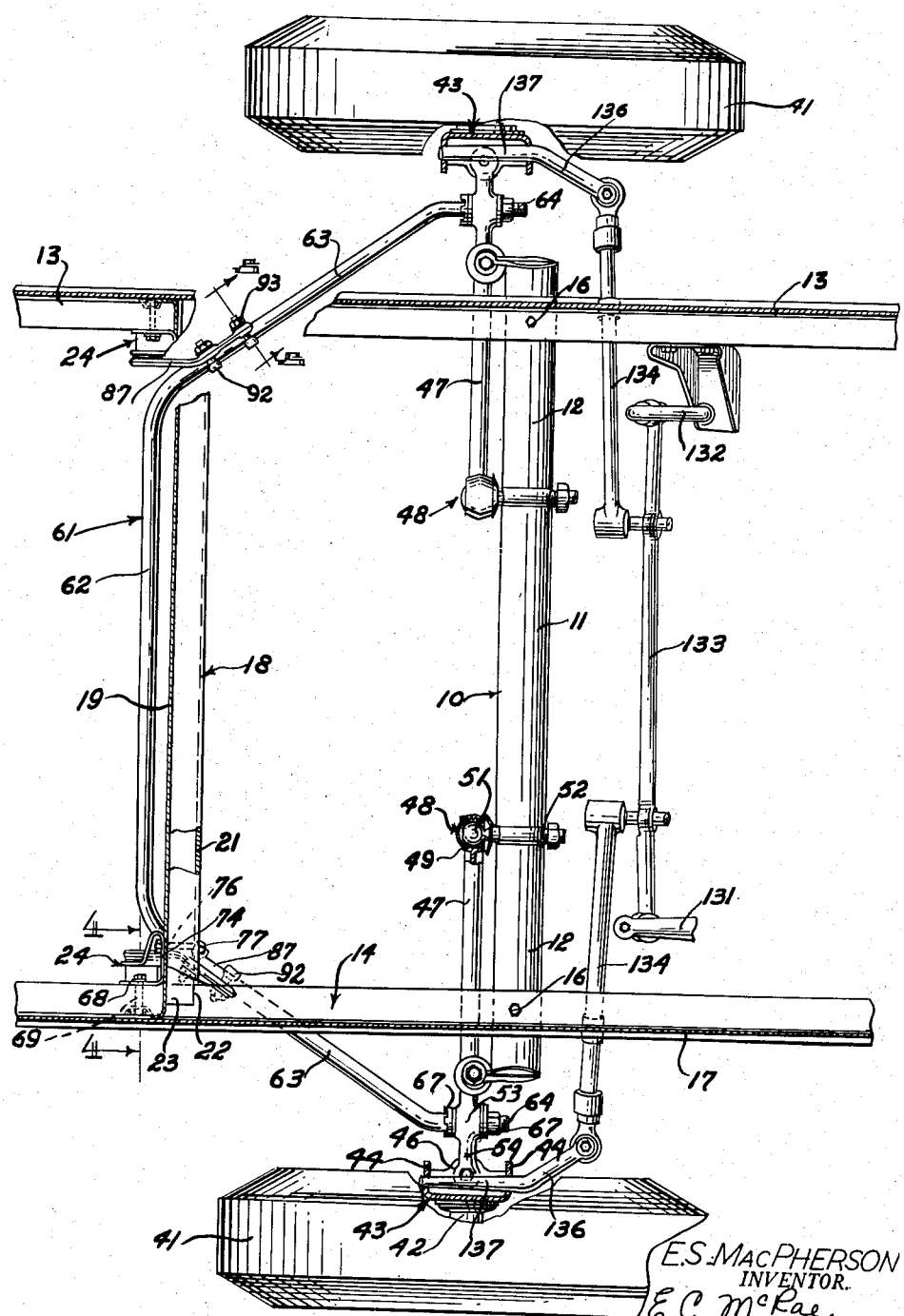

2,660,449

UNITED STATES PATENT OFFICE 2,660,449

WHEEL SUSPENSION FOR MOTOR VEHICLES

Earle S. MacPherson, Detroit, Mich., assignor to Ford Motor Company, Dearborn, Mich., a corporation of Delaware Application January 27, 1949, Serial No. 73,044

6 Claims. (Cl. 280—96.2)

This invention relates generally to motor vehicles and more particularly to a wheel suspension for motor vehicles.

An object of the present invention is to provide a wheel suspension system for independently suspending the road wheels of a motor vehicle in such manner as to provide improved ride characteristics. While the features of the construction are particularly adapted for the front wheel suspension of motor vehicles of the type having an integral frame and body structure, many of the features may also be used with rear wheel suspensions and with vehicles having the usual separate frame and body assemblies. A further object is to provide a suspension which is unusually light in weight and in which a considerable saving in cost is made by the elimination of many conventional suspension parts and assemblies. This is accomplished by combining a number of the functions of the suspension system. For example, a stabilizer bar is provided which not only serves to effect transverse stability in the usual manner but also forms part of the wheel supporting and guiding structure, eliminating the need for separate assemblies therefor. Likewise, a sturdy direct acting tubular shock absorber forms part of the wheel supporting and guiding structure, combining several functions into a single assembly. These and other advantageous features of the present invention result in a simplified, light weight and economical wheel suspension having very desirable ride and performance characteristics.

The foregoing and other advantages will be made more apparent as this description proceeds, particularly when considered in connection with the accompanying drawings, wherein:

Figure 1 is a plan view of the forward portion of the chassis of a motor vehicle constructed in accordance with the present invention, with certain parts thereof broken away and in section.

Figure 2 is a side elevation of the forward portion of the motor vehicle shown in Figure 1, with part of the front fender and hood broken away, and with the left front wheel in phantom, to illustrate a portion of the front wheel suspension and the integral frame and body construction.

Figure 3 is a transverse cross sectional view taken substantially on the plane indicated by the line 3—3 of Figure 2.

Figures 4 and 5 are enlarged cross sectional views taken substantially on the planes indicated by the lines 4—4 and 5—5 respectively of Figure 1.

For the purposes of the present invention it will not be necessary to describe in detail the entire structure of the unitary body and frame of the vehicle. The forward portions thereof, however, will be briefly described since the independent suspension system for the front wheels is supported upon this structure.

Referring now more particularly to the drawings, a tubular cross member 10 extends transversely of the vehicle slightly rearwardly of the center line of the two front wheels, and comprises a horizontal straight center section 11 and upwardly inclined end sections 12. A pair of longitudinally extending channel shaped side members 13 and 14 extend over the end sections 12 of the tubular cross member 11 and are secured thereto by bolts 16. The open sides of the channel shaped side members 13 and 14 are closed by sheet metal side panels 17 extending generally vertically and longitudinally of the vehicle and welded at their lower edges to the side members. Forwardly of the tubular cross member 10, the side members 13 and 14 are joined together by a channel shaped front cross member 18. The front cross member 18 faces forwardly, and the open side thereof is closed by a sheet metal front panel 19 which is welded thereto. As best seen in Figure 1, the base or rearward flange 21 of the front cross member 18 is cut away adjacent each end as at 22, to permit the end portions 23 of the upper and lower legs of the channel to extend above and below the side members 13 and 14. The flanges 23 are welded to the side members, and in addition the front cross member 18 and the side members 13 and 14 are further strengthened and joined together by means of brackets 24 which are bolted to the front cross member and also to the side members. The brackets 24 also serve to support a portion of the suspension system for the front wheels, and will be described more in detail later.

As will be seen from an examination of Figure 2, the front sheet metal panel 19 is located immediately adjacent the rearward side of a conventional radiator 25 and is formed with an opening 26 therein to permit air for cooling purposes to be drawn through the radiator. At the rearward end of the engine compartment, a transverse generally vertically extending sheet metal cowl panel 27 is provided. The two side panels 17, the front panel 19, and the cowl panel 27 are welded or otherwise secured to each other along their adjacent edges to form a generally box-shaped enclosure for the engine compartment of the vehicle. This box section is further reinforced by the side members 13 and 14 and also by braces 28 and 29 which extend between the side members and the cowl panel 28 to provide further strength and rigidity.

It will be noted that the sheet metal side panels 17 not only form structural parts of the integral body and frame assembly and form the outer side walls of the engine compartment, but in addition serve as the inner walls of the wheel housings. The outer walls of the wheel housings are of course formed by the fenders 30 which cooperate with the hood 31 and the radiator grille (not shown) to completely enclose the forward portion of the vehicle.

Each longitudinally extending sheet metal side panel 17 is bowed inwardly in transverse alignment with the center line of the front wheels to form a vertically extending outwardly facing pocket 32 to provide clearance for a portion of the front wheel suspension and to strengthen the side panel. As best shown in Figure 3, at its upper edge the side panel 17 is bent outwardly to form a generally horizontally extending flange 33 secured at its forward and rearward ends to the front panel 19 and the cowl panel 28 respectively. In the region of the pocket 32, the horizontal flange 33 is provided with a circular opening 34 to receive an inverted cup-shaped member 36 suitably supported therein. Additional support is provided by bolting the portion of the member 36 protruding upwardly through the opening 34 to a horizontal reinforcing plate 37. In addition, the outer portion of the member 36 is supported and tied into the side panel 17 by means of a U-shaped sheet metal bracket 38 enclosing the upper portion of the pocket 32 formed in the side panel.

Having now briefly described the forward portion of the integral frame and body construction, the front wheel suspension system mounted thereon will now be described, and since the two sides of the vehicle are symmetrical insofar as the wheel suspension is concerned, only the suspension for the left front wheel will be described in detail.

Referring now to Figure 3, it will be seen that each front wheel 41 is generally of conventional construction and is journaled upon a wheel spindle 42. A wheel supporting bracket 43 is bolted to the inner flange of the wheel spindle, and is in the form of a relatively heavy vertically extending plate having side and bottom flanges 44 and 46 integrally formed therewith.

Each front wheel is independently suspended for rising and falling movement with respect to the vehicle and is also mounted for pivotal movement about a generally vertical axis to permit the front wheels to be turned to steer the vehicle. Each front wheel is provided with a transverse suspension arm 47. The inner end of each transverse suspension arm is universally mounted upon the tubular cross member 10 by means of a conventional ball and socket joint 48, the socket 49 thereof being provided at the end of the suspension arm and the ball 51 being integrally formed at the forward end of a bolt 52 extending through and secured to the tubular cross member 10. Near its outer end the suspension arm 47 is provided with an enlarged boss 53 merging into a short integral flange 54 forming an extension of the suspension arm. This flange is provided with a vertical bore through which extends a bolt 56 formed with a ball at its lower extremity for cooperation with a socket 57 carried by the bottom flange 46 of the wheel supporting bracket 43. This ball and socket joint, indicated generally by the reference character 58, provides a universal connection between the transverse suspension arm and the lower portion of the wheel supporting bracket. A rubber bumper 59 is carried at the outer end of the tubular cross member 10 in vertical alignment with the suspension arm 47 to limit the upward travel of the latter.

Longitudinal movement of the outer end of the suspension arm 47, and accordingly the lower end of the wheel supporting bracket 43, is controlled by means of a stabilizer bar indicated generally by the reference character 61. As best seen in Figure 1, the stabilizer bar has a central transversely extending straight portion 62 and integral thrust arms 63 extending diagonally rearwardly therefrom and terminating in short longitudinally extending end portions 64. Each end portion is threaded and extends through a pair of rubber bushings 65 mounted in a bore 66 formed in the boss 53 of the transverse suspension arm, and is rigidly clamped thereto by means of nuts 67 provided at opposite sides of the boss 53.

Means are provided for mounting the stabilizer bar 61 for pivotal movement about the transverse axis of the straight central portion 62 of the bar. As previously mentioned, the front cross member 18 and the side frame members 13 and 14 are tied together by brackets 24. Referring to Figures 1, 2 and 4, each bracket 24 is generally U-shaped with its open side facing forwardly and with its outer side wall 68 secured to the adjacent channel shaped side member by means of bolts 69 and nuts 71. The bolts 69 extend through spacers 72 separating and strengthening the box section formed by the channel shaped side member 14 and the side panel 17. A gasket 73 separates the side wall of the bracket from the side member 14 to eliminate noise.

In a similar manner the rear wall 74 of the bracket 24 is secured to the front cross member 18 by means of bolts 76 and nuts 77. The lower portions of the side walls of the channel shaped bracket 24 are apertured at 78 to receive a sleeve 79 which is welded therein. A pair of flanged rubber bushings 81 are received within the sleeve 79 and a stub shaft 82 extends through the rubber bushings, the latter being clamped together between the enlarged flange 83 of the shaft and a washer 84 by means of a nut 86 threaded upon the end of the shaft. A swinging arm 87 is carried at the extending end of the stub shaft 82 between the flange 83 and the peened over end 88 of the shaft. It will be apparent that the swinging arm 87 is thus mounted for pivotal movement about the axis of the stub shaft 82.

As best seen in Figures 2 and 5, the swinging arm 87 extends rearwardly and is formed with a groove 89 for receiving the thrust arm 63 of the stabilizer bar 61. A rib 91 is provided opposite the groove 89 to strengthen the swinging arm. A pair of U-shaped shackle bolts 92 encircle the arm 63 of the stabilizer bar and clamp the latter rigidly to the swinging arm 87, nuts 93 being used for this purpose.

From the foregoing it will be seen that the transverse suspension arm 47 and the thrust arm 63 of the stabilizer bar cooperate to guide and support the lower end of the wheel supporting bracket 43. It will be noted that the transverse axis of the straight central portion 62 of the stabilizer bar is axially aligned with the stub shafts 82 carried by the brackets 24 so that the stabilizer bar is mounted for pivotal movement about this axis. During rising and falling movement of the front wheel, the outer end of the transverse suspension arm 47 necessarily moves in an arc about the axis of the central portion of the stabilizer bar. The resulting fore and aft movement of the outer end of the suspension arm 47, as well as its vertical swinging movement, is permitted by the ball and socket joint 48 at the inner end of the suspension arm. The ball and socket joint 58 between the outer end of the suspension arm and the bottom flange 46 of the wheel supporting bracket 43 accommodate the vertical wheel movement, and also permit the wheel to be turned about a generally vertical axis to steer the vehicle.

Figures 2 and 3 best illustrate the telescoping strut assembly extending vertically from the top of the wheel supporting bracket 43 and serving not only to guide and support the latter but also to provide for turning the front wheel to steer the vehicle. This assembly also includes a coil spring and shock absorber to control the wheel movement.

Reference character 96 indicates a direct acting tubular type shock absorber which is generally similar in construction and operation to conventional shock absorbers now in common use on motor vehicles. The present shock absorber is, however, of considerably heavier and sturdier construction since in addition to performing the usual functions of a shock absorber it serves as a telescoping strut supporting and guiding the wheel. The shock absorber includes an outer reservoir tube 97 and a concentric inner pressure tube 98 forming a fluid reservoir therebetween. A valved piston 99 carried at the lower end of a piston rod 101 is slideably mounted in the pressure tube 98 and valves the fluid between the fluid chambers above and below the piston to dampen shocks in the usual manner. At the lower end of the pressure tube a conventional relief valve (not shown) permits flow of fluid between the pressure tube and the reservoir tube to accommodate the displacement of fluid by the piston rod and to replenish lost fluid.

The lower end of the shock absorber is mounted in a tubular support 102, preferably in the form of a casting, which has an integral flange 103 rigidly bolted to the upper portion of the wheel supporting bracket 43. The upper ends of the reservoir and pressure tubes 97 and 98 are so shaped as to cooperate with each other to form a spherical housing 104 for the spherical bearing 106. A bushing 107 is mounted within the spherical bearing and slideably receives the piston rod 101. The spherical bearing is thus self-aligning to accommodate for manufacturing variations and to provide a smooth running fit.

A collar 108 is welded to the reservoir tube 97 near its upper end and in turn supports the lower spring pan 109. A coil spring 111 extends between the lower spring pan 109 and an upper spring pan 112 which is clamped between a shoulder 113 on the piston rod and the inner race 114 of a thrust bearing 116. A nut 117 is threaded on the upper end of the piston rod 101 to clamp the parts together. The outer race 118 of the thrust bearing is received within an annular rubber mounting 119 of the shear type. The rubber mounting is bonded to the outer race and also to a sleeve 121 pressed within the upper cap 122, the latter in turn being bolted to the upper wall of the cap 36 and to the horizontal plate 37 of the body by means of bolts 123.

Mounted concentrically within the coil spring 111 is a boot 124 of oil resistant synthetic rubber. The lower end of the boot is secured by a clamp 126 to the reservoir tube while the upper end of the boot is held between the upper spring pan 112 and a bell shaped retainer 127. Just above the point of connection of the boot to the reservoir tube 97, the latter is provided with a port or spring 128 for the passage of fluid between the interior of the reservoir tube and the interior of the boot.

The steering linkage for the front wheels is generally conventional, with the exception of the method of attaching the steering arms to the front wheel supporting brackets. As shown in Figure 1, the pitman arm 131 from the steering gear (not shown) is joined to an idler arm 132 by a tie rod 133. Drag links 134 are universally connected at their inner ends to intermediate points on the tie rod 133 and at their outer ends are pivotally connected to the rearward end of steering arms 136. The shanks 137 of the steering arms are tapered and are received in aligned holes formed in the opposite side flanges 44 of the wheel supporting brackets 43. The tapered shanks of the steering arms are then welded to the bracket flanges.

It will be seen that the lower portion of each wheel supporting bracket 43 is guided in its vertical movement relative to the vehicle by means of the transverse suspension arm 47 and the rearwardly extending thrust arm 63 of the stabilizer bar 61. The transverse suspension arm takes the transverse loads from the front wheel while the trust arm 63 takes the longitudinal loads. The stabilizer bar 61 thus not only forms part of the supporting and guiding means for the wheel but in addition functions as a torsion stabilizer bar to transmit vertical movement of one wheel through the bar to the wheel on the opposite side of the vehicle. During stabilization the thrust arms serve as lever arms for the straight central portion 62 of the stabilizer bar to place the central portion in torsion. The need for a separate stabilizer bar is thus eliminated, resulting in a simplification of the wheel suspension system and reducing the cost thereof.

The upper portion of each wheel supporting bracket 43 is guided and supported by the vertical strut assembly previously described. The shock absorber 96 is constructed sufficiently strong to perform not only the usual function of a shock absorber but also to serve as part of the wheel supporting structure. Since the reservoir and pressure tubes 97 and 98 are rigidly mounted upon the wheel supporting bracket 43 while the piston rod 101 is operatively connected to the integral frame and body assembly, a vertically extensible and contractible strut is provided which guides and supports the wheel, while at the same time performing the functions of the conventional shock absorber. This dual function is accomplished without the necessity of providing additonal parts and hence results in a saving of labor and materials.

The thrust bearing 116 rotatably connects the upper end of the piston rod to the unitary frame and body assembly to take vertical thrust while permitting turning of the wheel to steer the vehicle. Transmission of excessive vibration and sound from the road wheels to the body is prevented by the rubber shear mounting 119 which also serves to accommodate slight angular movement of the strut assembly. In addition, the thrust arms 63 of the stabilizer bar are also insulated from the frame and body by the rubber bushings in the pivotal connection between the brackets 24 and the swinging arms 87 which carry the thrust arms 63.

Due to the fact that the thrust bearing is located in a relatively high position, the change in caster and camber during vertical movement of the front wheels is minimized.

It will be understood that the invention is not to be limited to the exact construction shown and described, but that various changes and modifications may be made without departing from the spirit and scope of the invention, as defined in the appended claims.

The word "frame" as used in the appended claims refers to any structural part or parts of the sprung portion of a motor vehicle, whether the latter be of the type having a unitary frame and body structure or a separate frame and body joined together after being sub-assembled.

What is claimed is:

1. In a vehicle having a pair of laterally spaced wheel assemblies upon which a frame is spring supported, said frame having longitudinally side frame members interconnected by a cross frame member located in the zone of said wheel assemblies and a front cross frame member spaced longitudinally forwardly of said first mentioned cross frame member, a pair of suspension arms each universally mounted upon said first mentioned cross frame member at spaced points intermediate said side frame members and each extending transversely outwardly to a wheel assembly, a pair of downwardly depending brackets each located at the junction between said front cross frame member and one of said frame members and rigidly secured thereto, a swinging arm pivotally mounted upon the lower portion of each of said downwardly depending brackets, and a stabilizer bar having a transversely extending straight central portion axially aligned with the axes of the pivotal connections between said swinging arms and said brackets, said stabilizer bar having side thrust arms integrally formed with said central portion and extending diagonally rearwardly therefrom, means clamping said thrust arms to said swinging arms, means connecting the rearward ends of said thrust arms to said suspension arms at points immediately adjacent the points of connection of said suspension arms to said wheel assemblies, and suspension means connected between said frame and said wheel assemblies to support said frame and guide said wheels in a generally vertical direction, said suspension means being connected to said wheel assemblies above the points of connection of said suspension arms to said wheel assemblies and being connected to said frame at a point above the connection to said wheel assemblies.

2. In a vehicle having a frame, a pair of road wheels on opposite sides of said frame, a pair of generally transversely extending suspension arms each supporting one road wheel at its outer end and having its inner end universally connected at a single point to said frame to control the transverse location of the wheel during its rising and falling movement, the connection between each of said arms and said frame comprising a ball joint having one element thereof connected to said frame and the other element thereof connected to the inner end of said arm, a stabilizer bar extending generally transversely of said frame and mounted thereon for pivotal movement about a transverse horizontal axis, the opposite ends of said stabilizer bar being operatively connected to said road wheels to control the longitudinal position of said wheels during their rising and falling movements, and suspension means connected between said frame and said road wheels to guide the latter in a generally vertical direction, said suspension means being connected to said road wheels above the points of connection of said suspension arms to said road wheels and being connected to said frame at a point above the connection to said wheel assemblies.

3. In a vehicle having a pair of laterally spaced wheel assemblies upon which a frame is spring supported, a pair of suspension arms each universally mounted at their inner ends and extending transversely outwardly to a corresponding wheel assembly, a pair of downwardly depending brackets secured at transversely spaced points to said frame, a swinging arm pivotally mounted upon the lower portion of each of said downwardly depending brackets, and a stabilizer bar having a transversely extending straight central portion axially aligned with the axis of the pivotal connections between said swinging arms and said brackets, said stabilizer bar having side thrust arms integrally formed with said central portion and extending diagonally therefrom, means clamping said thrust arms to said swinging arms, means connecting the free ends of said thrust arms to said suspension arms at points closely adjacent the points of connection of said suspension arms to said wheel assembly, and suspension means connected between said frame and said wheel assemblies to support said frame and guide said wheels in a generally vertical direction, said suspension means being connected to said wheel assemblies above the points of connection of said suspension arms to said wheel assemblies and being connected to said frame at a point above the connection to said wheel assemblies.

4. In a vehicle having a pair of laterally spaced wheel assemblies upon which a frame is spring supported, a pair of generally transversely extending suspension arms each connected at its outer end to a wheel assembly, a pair of ball joints each having one element thereof connected to said frame and the other element thereof connected to the inner end of one of said suspension arms, and a one piece stabilizer bar mounted upon said frame for pivotal movement about a transverse horizontal axis longitudinally spaced from said suspension arms, said stabilizer bar having integral thrust arms at opposite sides of the vehicle extending generally diagonally with respect to said transverse horizontal axis and each directly connected to one of said wheel assemblies to take substantially the entire longitudinal thrust from said wheel assemblies.

5. In a vehicle having a frame, a pair of road wheels mounted on wheel spindles at opposite sides of said frame, a generally vertically extending wheel supporting bracket carried by each of said wheel spindles, a pair of vertically extending direct acting tubular shock absorbers each connected at one end to the adjacent wheel supporting bracket and at its opposite end to said frame and transmitting vertical thrust from the adjacent road wheel to the frame as well as guiding the adjacent wheel in a predetermined vertical path, a pair of suspension arms each extending transversely outwardly from said frame to one of said road wheels and having a universal connection at its inner end with said frame and a universal connection at its outer end with the adjacent wheel supporting bracket, and a stabilizer bar mounted on said frame for pivotal movement about a transverse horizontal axis, said stabilizer bar having integral thrust arms extending generally longitudinally of the vehicle and each connected at its free end to the adjacent suspension arm adjacent the universal connection of the latter to the adjacent wheel supporting bracket to transmit longitudinal thrust from said road wheel to said frame, the connection between each thrust arm of the stabilizer bar and the adjacent suspension arm including a resilient bushing to accommodate relative angular movement between said arms.

6. In a vehicle having a pair of laterally spaced wheel assemblies upon which a frame is spring supported, a pair of generally transversely extending suspension arms each universally connected at its inner end to said frame and universally connected at its outer end to a wheel assembly to take lateral thrust from said wheel assembly without taking any of the longitudinal thrust therefrom, and a stabilizer bar having a transversely extending straight central portion and integral thrust arms at opposite ends of the straight central portion extending generally diagonally rearwardly with respect to said straight portion, said stabilizer bar being mounted upon said frame for pivotal movement about a transverse horizontal axis longitudinally spaced forwardly from said suspension arms and substantially coinciding with the axis of the straight central portion of the bar, the free ends of the diagonally extending thrust arms of the stabilizer bar being fixed longitudinally with respect to the suspension arms adjacent the connections of the latter to said wheel assemblies to control the longitudinal positions of said wheel assemblies during their rising and falling movements relative to said frame and to take substantially the entire longitudinal thrust from said wheel assemblies.

E. S. MacPHERSON.

References Cited in the file of this patent

UNITED STATES PATENTS

| Number | Name | Date |
|---|---|---|
| 1,711,881 | Fornaca | May 7, 1929 |
| 2,027,577 | Crane | Jan. 14, 1936 |
| 2,085,738 | Coleman | July 6, 1937 |
| 2,124,087 | Smith | July 19, 1938 |
| 2,138,114 | Nelson | Nov. 29, 1938 |
| 2,190,298 | Slack | Feb. 13, 1940 |
| 2,241,827 | Rabe | May 13, 1941 |
| 2,253,645 | Paton | Aug. 26, 1941 |
| 2,254,325 | Slack et al. | Sept. 2, 1941 |
| 2,290,923 | Wahlberg | July 28, 1942 |
| 2,305,795 | Schieferstein | Dec. 22, 1942 |
| 2,322,879 | Piron | June 29, 1943 |
| 2,403,145 | Ulrich | July 2, 1946 |
| 2,409,500 | Krotz | Oct. 15, 1946 |
| 2,483,974 | Hicks et al. | Oct. 4, 1949 |
| 2,517,611 | Utz | Aug. 8, 1950 |
| 2,523,473 | Leighton | Sept. 26, 1950 |
| 2,567,144 | Butterfield | Sept. 4, 1951 |
| 2,624,592 | MacPherson | Jan. 6, 1953 |

FOREIGN PATENTS

| Number | Country | Date |
|---|---|---|
| 858,747 | France | May 20, 1940 |